United States Patent
Shimamune et al.

(10) Patent No.: US 6,821,575 B2
(45) Date of Patent: Nov. 23, 2004

(54) ELECTRODE TREATMENT

(75) Inventors: Takayuki Shimamune, Tokyo (JP); Bernd Busse, Darmstadt (DE); Erik Zimmerman, Ljungaverk (SE); Lars-Erik Bergman, Ljungaverk (SE)

(73) Assignee: Advanced Photonics Technologies AG, Bruckmühl-Heufeld (DE)

( * ) Notice: Subject to any disclaimer, the term of this patent is extended or adjusted under 35 U.S.C. 154(b) by 0 days.

(21) Appl. No.: 10/020,228

(22) Filed: Dec. 18, 2001

(65) Prior Publication Data

US 2002/0114964 A1 Aug. 22, 2002

Related U.S. Application Data

(60) Provisional application No. 60/256,920, filed on Dec. 12, 2000.

(51) Int. Cl.$^7$ ................................................. B05D 3/06
(52) U.S. Cl. ........................ 427/553; 427/556; 427/77; 427/226
(58) Field of Search ................................ 427/553, 556, 427/557, 559, 512, 226, 521, 77, 78, 542, 515

(56) References Cited

U.S. PATENT DOCUMENTS

| | | | |
|---|---|---|---|
| 3,632,498 A | | 1/1972 | Beer .......................... 204/290 |
| 5,035,779 A | | 7/1991 | Nishiki ........................ 204/98 |
| 5,221,561 A | * | 6/1993 | Flicstein et al. ............. 427/553 |
| 5,928,710 A | | 7/1999 | Busse .............................. 427/8 |
| 2001/0006722 A1 | * | 7/2001 | Sakai et al. .................. 427/555 |
| 2003/0072890 A1 | * | 4/2003 | Miyazawa ................... 427/554 |

FOREIGN PATENT DOCUMENTS

| | | | |
|---|---|---|---|
| JP | 60243279 A | * 12/1985 | ................ 427/542 |
| JP | 60243280 A | * 12/1985 | |
| WO | 99/02762 | 1/1999 | ........... C25B/11/00 |
| WO | 99/47276 | 9/1999 | ........... B05D/3/02 |

OTHER PUBLICATIONS

Translation of 560-243,279 to Tanaka et al. (previously cited)—Japanese doc.), Dec. 3, 1985.
Translation of 60-243280 (previously cited Japanese doc.), Dec. 3, 1985.
English Language Abstract of International Application No. WO 99/47276, International Publication Date: Sep. 23, 1999, Sedlmeyr.
XP-002168405—English Language Abstract of JP60243280, Tanaka et al.

* cited by examiner

*Primary Examiner*—Marianne Padgett
(74) *Attorney, Agent, or Firm*—David J. Serbin

(57) ABSTRACT

The invention relates to a method for preparing a conductive electrode comprising applying a precursor for electrocatalytic or protective coatings on a conductive electrode substrate, irradiating the conductive electrode substrate and the precursor with near infrared (NIR) radiation to form an electrocatalytic or protective coating on the electrode substrate.

The invention also relates to an electrode substrate or electrode obtainable by the method, and the use thereof.

11 Claims, No Drawings

ELECTRODE TREATMENT

This application claims the benefit of provisional application Ser. No. 60/256,920 filed Dec. 21, 2000.

The invention relates to a method for treating an electrode substrate. The invention also relates to an electrode substrate obtainable by said method and the use thereof.

BACKGROUND

The use of electrodes obtained by coating an electrode substrate with an electrocatalytic solution is well-known in the art, e.g. in electrolytic processes.

WO99/02762 discloses a method for applying an electrocatalytic or protective coating to a metal substrate comprising applying a precursor of the electrocatalytic or protective coating to the surface of the substrate, and decomposing the precursor by means of a hot air jet supplied from a gun or blower. This method requires a treatment time of about 1 hour.

U.S. Pat. No. 3,632,498 describes a method for treating electrode substrates in an oven. This method also takes about an hour to complete. The method is very energy-demanding, as the energy consumed by the oven is considerable.

U.S. Pat. No. 5,928,710 describes a process for restoring a coating in an electrode assembly. A coating solution is cured by heating the electrode surface while a conductive rod is simultaneously being force-cooled. Also in this process, the treatment time is fairly long.

It is well known in the art that electrodes and electrode substrates treated in this way are liable to deformation, which is very undesirable when the electrodes are used in electrochemical applications. Deformed or nonplanar electrodes may cause severe damage of other elements arranged in an electrolysis plant. It is often difficult to straighten or make a deformed electrode planar again.

It is desired in the art to develop a more effective method for treating electrode substrates making the treatment less time-consuming, less energy-demanding and at the same time, provide a treated electrode or electrode substrate which has not undergone deformation during the treatment. The present invention intends to solve the above problems.

THE INVENTION

The present invention relates to a method for preparing a conductive electrode comprising applying a precursor for electrocatalytic or protective coatings on a conductive electrode substrate. The conductive electrode substrate and the precursor are irradiated with near infrared (NIR) radiation to form an electrocatalytic or protective coating on the electrode substrate.

It has been surprisingly found that the inventive method can considerably reduce the time of treatment. The inventive method leads to an immense saving of time, which makes prompt use of the treated electrode substrates possible. Prompt use of electrodes may be a prerequisite especially for its use in larger electrochemical plants where a production stop caused by problems of providing prepared electrodes may have serious consequences.

A further advantage of the inventive method consists in that the treated electrode substrates will not be liable to deformation in contrast to electrode substrates treated according to prior art techniques which involved heat treatment or irradiation, especially irradiation by middle IR radiation, often performed during a fairly long period of time.

Preferably, the electrode substrate and the precursor are irradiated less than about 10 minutes, more preferably less than about 5 minutes, and most preferably less than about 1 minute. However, even during treatment times up to about 10 minutes, the electrode substrate may be irradiated to such an extent that the electrode substrate is deformed and becomes nonplanar. This partly depends on the energy density the electrode substrate is exposed to. If the NIR irradiation time is longer than about 10 minutes, the electrode substrate is likely to be detrimentally affected. Especially after 15 to 20 minutes of treatment, in particular at a temperature of about 500° C., the electrode may be deformed to such an extent that the electrode must be straighten such that it is made planar, which may be difficult. According to yet a preferred embodiment, the NIR irradiation time is shorter than 30 seconds, preferably shorter than 15 seconds.

Preferably, the electrode substrate should not be exposed to other irradiation than NIR irradiation, especially not middle IR radiation or UV radiation because of detrimental effects.

A further advantage of the present invention is a considerable saving of energy provided by use of irradiation of near infrared (NIR) light.

The near infrared (NIR) irradiation can be performed by means of any type of near infrared (NIR) irradiation device. A suitable irradiation device typically comprises halogen lamps in combination with a reflector for reflecting the radiation emitted in the direction of the electrode substrate. Preferably, the device used is as described in WO99/47276, preferably a device which emit radiation only in the near infrared region. This can be ascertained by use of a filter which substantially blocks wavelengths outside said region.

By the term near infrared (NIR) region is meant electromagnetic radiation having wavelengths in the spectrum from about 780 to about 2500 nm. The NIR device containing halogen lamps are operated in such a way that a maximised irradiation of the emitted radiation from the halogen lamps is in the near infrared region.

According to a preferred embodiment of the method, the irradiation of near infrared (NIR) radiation is carried out in the wavelength region from about 780 nm to about 2500 nm. In a more preferred embodiment, the irradiation of near infrared (NIR) radiation is carried out in the wavelength region from about 780 to about 2000 nm, and most preferably from about 780 nm to about 1200 nm.

By the term electrode substrate is meant to include, besides conventional electrode substrates as used in electrolysis processes, also other electrode substrates on which electrochemical reactions occur, e.g. for cathodic protection.

The electrode substrate is a conductive material, preferably a metallic material, which preferably, at least to some extent, is resistant to an electrolyte in which it is to be used. For example, the electrode substrate may be made of any metal such as aluminium, tantalum, titanium, zirconium, bismuth, tungsten, niobium, iron, steel, chromium, vanadium, manganese, cobolt, nickel, copper, silver, platinum, led, or alloys thereof. Also, other conductive materials substantially resistant to an electrolyte, such as e.g. graphite, ceramic materials may be used.

By the term electrode substrate is also meant to include an electrode comprising at least an electrode substrate and suitably an electrocatalytic or protective coating applied on said electrode substrate, which electrode substrate can be at least partly activated or partly deactivated.

The precursor suitably is at least one organic or inorganic salt, or mixture of salts comprising at least one metal suitably selected from ruthenium, iridium, platinum, rhodium, palladium, titanium, zirconium, hafnium, tantalum, niobium, tin, or mixtures thereof, preferably ruthenium, iridium, titanium or mixtures thereof, the radiation of which results in an electrocatalytic or protective coating of corresponding metal oxides. The precursor suitably is present in an organic or aqueous solution.

According to a preferred embodiment, the method is repeated at least once. The number of repeating times will depend on the application of the treated electrode substrate, or on the coating precursor used. The number of treatments needed can be estimated through routine experimentation by a person skilled in the art. After the inventive treatment has been carried out, further treatment of the electrode substrate or electrode obtained may follow to obtain desired properties.

According to a further preferred embodiment of the method, the energy density of the radiation is from about 0.1 to about 2 kW/m$^2$ irradiated electrode substrate, preferably from about 0.1 to about 1 kW/m$^2$ irradiated electrode substrate. If the energy density is too high, this may also damage the electrode.

The maximal temperature the electrode or electrode substrate attains during the method is from about 400 to about 600° C., preferably from about 450 to about 530° C.

The invention also relates to a novel conductive electrode substrate or electrode having improved electrocatalytic properties obtainable by the method as described above, said electrode substrate or electrode suitably being provided with an electrocatalytic or protective coating.

The invention further relates to the use of a conductive electrode substrate or electrode, obtainable from the method as described above, for protecting flanges or other surfaces of an electrode substrate, e.g. against crevice corrosion. The electrode substrate or electrode may also be used in ordinary electrochemical processes for production of e.g. chlorine and alkali metal hydroxides, alkali metal chlorate etc. In addition, the electrode substrate or electrode may also be used for electrogalvanizing, electroplating and metal winning processes.

It will be obvious that the same may be varied in many ways, the invention being thus described. Such variations are not to be regarded as a departure from the gist and scope of the present invention, and all such modifications as would be obvious to one skilled in the art are intended to be included within the scope of the claims. The following example will further illustrate how the described invention may be performed without limiting the scope of it.

EXAMPLE

Six electrode samples A1–A3 and Z1–Z3 were prepared by first depositing metal-containing alcoholic solutions on titanium plates (used as electrode substrate). Prior to depositing the alcoholic solutions, the titanium samples were pretreated by means of etching in a 20 wt % HCl solution at 100° C.

The alcoholic solutions A1–A3 were prepared in the following way: 1 g of ruthenium in the form of ruthenium chloride and 1.2 g titanium in the form of titanium chloride were dissolved in 2 ml alcohol solvent and subsequently deposited on the samples A1–A3. In a similar way, samples Z1–Z3 were deposited by a 2 ml alcohol solution containing 0.5 g ruthenium in form of ruthenium chloride, 0.5 g iridium in the form of iridium chloride, and 1.2 g titanium in the form of titanium chloride.

The titanium samples were subsequently exposed 5 times each in a NIR device available from AdPhos AG, Bruckm ühler, in Germany. After the treatment, five electrocatalytic layers had formed on each electrode substrate. The samples A1 and Z1 were treated 5 seconds at each occasion in the NIR device, A2 and Z2 were treated for 4 seconds, and A3 and Z3 were treated for 3 seconds at each treatment occasion in the NIR device. The temperature of the treated electrode substrates were at the moment they were retrieved from the NIR device, 870° C. for A1 and Z1, 580° C. for A2 and Z2, and 480–500° C. for Z3 and A3. The energy density emitted by the NIR device were for A1 and Z1 1.1 kW per m$^2$ of electrode substrate area treated, for A2 and Z2 0.89 kW/m$^2$ electrode substrate area, and for A3 and Z3 0.67 kW/m$^2$ electrode substrate area.

The potentials of the coated electrode substrates were subsequently tested in respect of chlorine evolution under the following conditions: current density: 4A/m$^2$, NaCl concentration of 300 g/liter, pH 2 (adjusted by addition of HCl), temperature: 90° C. The treated electrode substrates were also tested in respect of oxygen evolution under the following conditions: current density:3kA/m$^2$, 300 g/liter Na$_2$SO$_4$, pH 2 (adjusted by addition of H$_2$SO$_4$), temperature: 60° C. As a reference, a conventional SCE was used (0.245 V versus NHE).

TABLE 1

| Electrode substrate | Chlorine vs NHE (V) | Oxygen vs NHE (V) |
| --- | --- | --- |
| A1 | 1.36 | 1.99 |
| A2 | 1.33 | 1.81 |
| A3 | 1.33 | 1.81 |
| Z1 | 1.40 | 2.05 |
| Z2 | 1.35 | 1.78 |
| Z3 | 1.33 | 1.69 |

The results as shown in table 1 can be compared to a conventional electrode, e.g. a normal DSA™ (dimensionally stable anode), which has a chlorine evolution potential of about 1.33–1.37 V, and an oxygen evolution potential of about 1.65–1.75 V. As can be seen in table 1, the oxygen evolution potentials are higher than for the conventionally prepared electrodes. However, a high oxygen evolution potential is advantageous in the sense that the oxygen evolution reaction is an undesired reaction that to some extent, as an effect of the elevated oxygen evolution potential, is at least partly out-competed by the chlorine evolution reaction, being the desired reaction occurring at the electrode surface. A Scotch Tape test, known in the art, was performed to evaluate the adhesiveness of the coatings to the electrode substrates. No traces of coating materials transferred to the tape could be observed for any of the prepared electrodes.

What is claimed is:

1. Method for preparing a conductive electrode comprising applying a precursor for electrocatalytic or protective coatings on a conductive electrode substrate, irradiating said conductive electrode substrate and said precursor less than about 10 minutes with near infrared (NIR) radiation to form an electrocatalytic or protective coating on the conductive electrode substrate.

2. Method as claimed in claim 1, wherein the conductive electrode substrate and the precursor are irradiated less than about 5 minutes.

3. Method as claimed in claim 1, wherein several electrocatalytic or protective coatings are formed on the conductive electrode substrate by repeating the method of claim 1.

4. Method as claimed in claim 1, wherein the precursor is at least one organic or inorganic salt, or mixture of salts comprising at least one metal selected from at least one of ruthenium, iridium, platinum, rhodium, palladium, titanium, zirconium, hafnium, tantalum, niobium, tin or mixtures thereof.

5. Method as claimed in claim 1, wherein the conductive electrode substrate is an at least partly deactivated conductive electrode.

6. Method as claimed in claim 1, wherein the precursor is present in an aqueous solution.

7. Method as claimed in claim 1, wherein the precursor is present in an organic solution.

8. Method as claimed in claim 1, wherein the conductive electrode substrate and the precursor are irradiated in the wavelength region from about 780 nm to about 1200 nm.

9. Method as claimed in claim 1, wherein the conductive electrode substrate is irradiated with an energy density ranging from about 0.1 to about 2 $kW/M^2$.

10. Method as claimed in claim 1, wherein the conductive electrode substrate is irradiated with an energy density ranging from about 0.1 to about 1 $kW/M^2$.

11. Method for preparing a conductive electrode comprising applying a precursor for electrocatalytic or protective coatings on a conductive electrode substrate, irradiating said conductive electrode substrate and said precursor with near infrared (NIR) radiation in the wavelength region from about 780 nm to about 2500 nm to form an electrocatalytic or protective coating on the conductive electrode substrate.

* * * * *